United States Patent
Shindo et al.

(10) Patent No.: US 7,184,606 B2
(45) Date of Patent: Feb. 27, 2007

(54) IMAGE PROCESSING APPARATUS AND METHOD, RECORDING MEDIUM, AND PROGRAM

(75) Inventors: Mitsuyoshi Shindo, Kanagawa (JP); Hiroaki Takano, Kanagawa (JP); Toshiaki Nakanishi, Chiba (JP)

(73) Assignee: Sony Corporation, Tokyo (JP)

( * ) Notice: Subject to any disclaimer, the term of this patent is extended or adjusted under 35 U.S.C. 154(b) by 783 days.

(21) Appl. No.: 10/316,809

(22) Filed: Dec. 11, 2002

(65) Prior Publication Data

US 2003/0156199 A1    Aug. 21, 2003

(30) Foreign Application Priority Data

Dec. 14, 2001  (JP) .............................. 2001-381149

(51) Int. Cl.
    *G06K 9/62* (2006.01)
(52) U.S. Cl. ...................... 382/255; 382/103; 382/118; 382/291; 396/80; 396/87
(58) Field of Classification Search ................ 382/103, 382/118, 151, 255, 278, 282, 286, 291; 396/80, 396/87, 326, 383
See application file for complete search history.

(56) References Cited

U.S. PATENT DOCUMENTS

| | | | | |
|---|---|---|---|---|
| 5,577,179 A | * | 11/1996 | Blank | ........................... 345/639 |
| 5,581,276 A | * | 12/1996 | Cipolla et al. | .............. 345/156 |
| 5,819,124 A | * | 10/1998 | Somner et al. | ............. 396/263 |
| 5,881,321 A | * | 3/1999 | Kivolowitz | .................. 396/53 |
| 6,023,224 A | * | 2/2000 | Meyvis | ..................... 340/545.1 |
| 6,173,068 B1 | * | 1/2001 | Prokoski | ..................... 382/115 |
| 6,353,764 B1 | * | 3/2002 | Imagawa et al. | .............. 700/1 |
| 6,496,594 B1 | * | 12/2002 | Prokoski | ..................... 382/118 |
| 6,631,991 B2 | * | 10/2003 | Wirth | .......................... 351/221 |
| 6,654,018 B1 | * | 11/2003 | Cosatto et al. | .............. 345/473 |

* cited by examiner

*Primary Examiner*—Mathew C. Bella
*Assistant Examiner*—Yosef Kassa
(74) *Attorney, Agent, or Firm*—Robert J. Depke; Rockey, Depke, Lyons & Kitzinger, LLC.

(57) ABSTRACT

In an image processing apparatus, the head top of a subject is detected, and the positions of a camera and a mirror are adjusted so that the coordinates of the detected head top coincide with the coordinates of a reference head top. When it is determined that the coordinates coincide with each other, the image size of a face of the subject is detected, and the zoom of the camera is controlled so that the detected image size and a reference image size coincide with each other. When it is determined that the image size of the face and the reference image size coincide, the positions of the camera and the mirror are adjusted again so that the coordinates of the head top of the subject and the coordinates of the reference head top coincide with each other.

10 Claims, 10 Drawing Sheets

IMAGE PROCESSING APPARATUS AND METHOD, RECORDING MEDIUM, AND PROGRAM

This application claims priority to Japanese Patent Application Number JP2001-381149 filed Dec. 14, 2001, which is incorporated herein by reference.

BACKGROUND OF THE INVENTION

1. Field of the Invention

The present invention relates to an image processing apparatus and method, a recording medium, and a program, and more particularly, to an image processing apparatus and method in which the position of taking, for example, an identification photograph is automatically adjusted, and to a recording medium and a program to be used in the apparatus and method.

2. Description of the Related Art

In known identification-photograph taking apparatuses, an operation of taking an image and an operation of printing the taken image are automatically performed for convenience of users. That is, the users can easily obtain an identification photograph simply by entering a predetermined booth, sitting on a stool installed in the booth, and inserting coins corresponding to a predetermined charge.

However, the users must adjust the height of the stool before the image-taking operation in order to align the eye level with a predetermined level.

In spite of the above adjustment, photographs are sometimes finished undesirably, for example, the eye level of an image of a subject is not properly aligned, or the image of the subject is too large or too short with respect to an image-taking area specified for an identification photograph.

SUMMARY OF THE INVENTION

The present invention has been made in view of such circumstances, and an object of the present invention is to automatically place an image of a user as a subject in a proper image-taking position without any trouble of the user.

In order to achieve the above object, according to an aspect, the present invention provides an image processing apparatus including an image-taking unit for taking an image of a subject, a first detecting unit for detecting the head top of the image of the subject taken by the image-taking unit, a first judgment unit for comparing the head top detected by the first detecting unit and first reference data to determine whether the detected head top coincides with the first reference data, a second detecting unit for detecting the size of a predetermined portion of the image of the subject, a second judgment unit for comparing the image size detected by the second detecting unit with second reference data to determine whether or not the detected image size coincides with the second reference data, and a control unit for controlling an image-taking position of the image-taking unit on the basis of results of the determinations by the first and second judgment units.

Preferably, the image processing apparatus further includes a sensing unit for sensing the subject, and the image-taking unit takes the image of the subject when the subject is sensed by the sensing unit.

Preferably, the image processing apparatus further includes a storage unit for storing the first and second reference data.

Preferably, the image processing apparatus further includes a display control unit for controlling the display of the image of the subject taken by the image-taking unit.

Preferably, the image processing apparatus further includes a printing unit for printing the image of the subject taken by the image-taking unit when the first and second judgement units determine that the detected head top and the first reference data coincide with each other, and that the detected image size and the second reference data coincide with each other, respectively.

Preferably, the second detecting unit detects the lateral size of a face of the subject.

Preferably, the control unit adjusts the position of at least one of a camera and a mirror.

According to another aspect, the present invention provides an image processing method including an image-taking step of taking an image of a subject with an image-taking unit, a first detecting step of detecting the head top of the image of the subject taken in the image-taking step, a first judgment step of comparing the head top detected in the first detecting step and first reference data so as to determine whether or not the detected head top coincides with the first reference data, a second detecting step of detecting the size of a predetermined portion of the image of the subject, a second judgment step of comparing the image size detected in the second detecting step with second reference data so as to determine whether or not the detected image size coincides with the second reference data, and a control step of controlling an image-taking position of the image-taking unit on the basis of results of the determinations in the first and second judgment steps.

According to a further aspect, the present invention provides a recording medium having a program recorded therein. The program includes an image-taking step of taking an image of a subject with an image-taking unit, a first detecting step of detecting the head top of the image of the subject taken in the image-taking step, a first judgment step of comparing the head top detected in the first detecting step and first reference data so as to determine whether or not the detected head top coincides with the first reference data, a second detecting step of detecting the size of a predetermined portion of the image of the subject, a second judgment step of comparing the image size detected in the second detecting step with second reference data so as to determine whether or not the detected image size coincides with the second reference data, and a control step of controlling an image-taking position of the image-taking unit on the basis of results of the determinations in the first and second judgment steps.

According to a further aspect, the present invention provides a program that causes a computer to execute an image-taking step of taking an image of a subject with an image-taking unit, a first detecting step of detecting the head top of the image of the subject taken in the image-taking step, a first judgment step of comparing the head top detected in the first detecting step and first reference data so as to determine whether or not the detected head top coincides with the first reference data, a second detecting step of detecting the size of a predetermined portion of the image of the subject, a second judgment step of comparing the image size detected in the second detecting step with second reference data so as to determine whether or not the detected image size coincides with the second reference data, and a control step of controlling an image-taking position of the image-taking unit on the basis of results of the determinations in the first and second judgment steps.

In the image processing apparatus and method, and the program of the present invention, an image of a subject is taken, the head top of the taken image of the subject is detected, and it is determined whether or not the detected head top coincides with the first reference data. Also, the size of a predetermined portion of the image of the subject is detected, and it is determined whether or not the detected image size coincides with the second reference data. The image-taking position is controlled on the basis of the results of the determinations. Therefore, the image of the subject can be automatically placed in a proper image-taking position without any trouble of the user.

Further objects, features, and advantages of the present invention will become apparent from the following description of the preferred embodiments with reference to the attached drawings.

DESCRIPTION OF THE PREFERRED EMBODIMENTS

An embodiment of the present invention will be described below with reference to the attached drawings.

Figure 1:
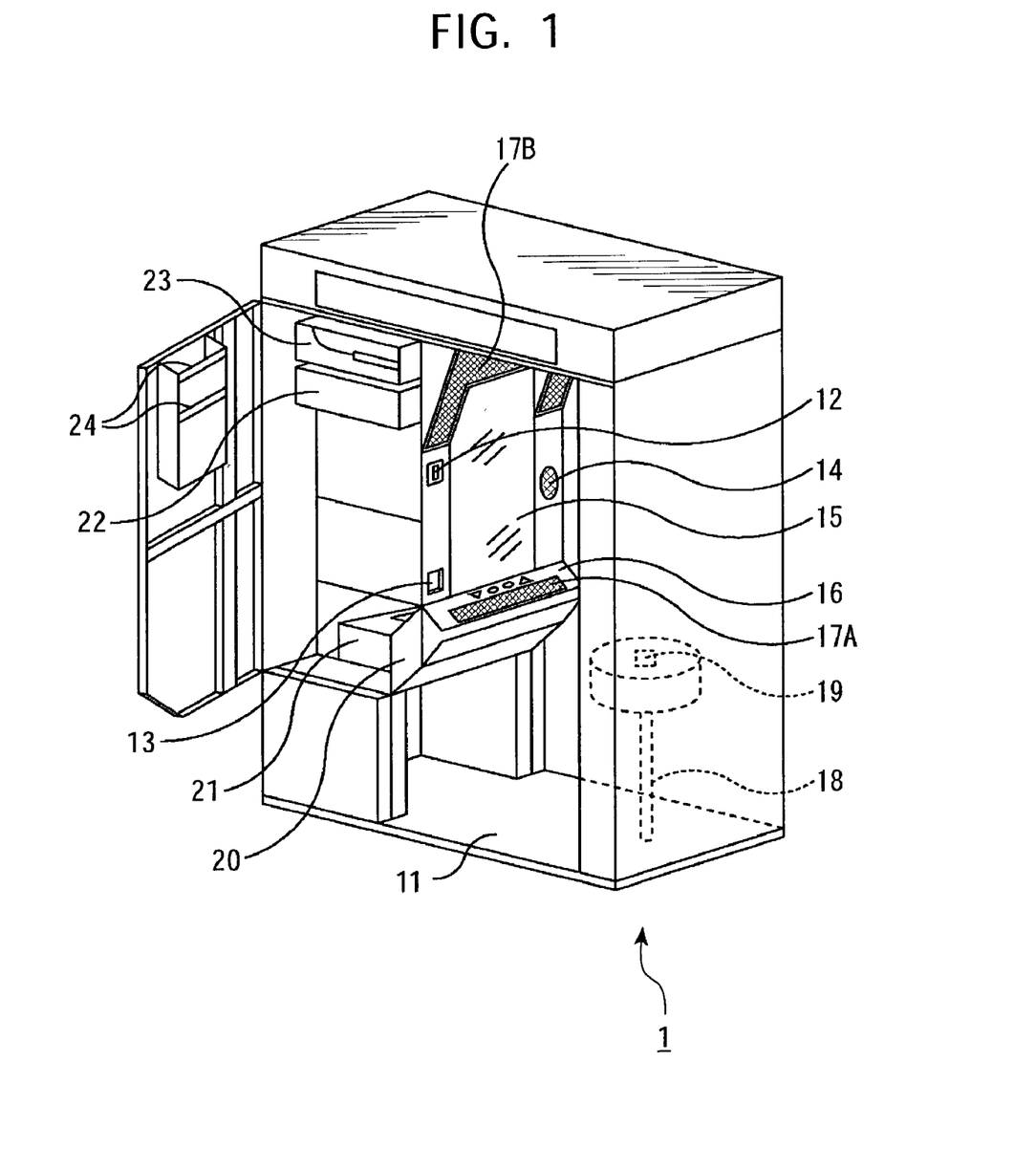
FIG. 1 is an external view of a photography booth to which the present invention is applied.

FIG. 1 shows the external appearance of a photography booth 1 to which the present invention is applied.

A housing 11 of the photography booth 1 is provided with a coin slot 12, a coin return 13, a speaker 14, an image-taking/checking monitor 15, a control panel 16, illumination devices 17A and 17B, a stool 18, and so on.

A user inserts coins corresponding to a predetermined charge into the coin slot 12. When the user cancels an image-taking operation, the coins inserted from the coin slot 12 are returned into the coin return 13. The speaker 14 outputs voice guidance and the like to the user. The image-taking/checking monitor 15 is formed of, for example, an LCD (Liquid Crystal Display), and displays an image (moving image) captured by a camera 48 (FIG. 2) in an image-taking section 21, a subject image (still image) taken by the camera 48, and a screen for image-taking guidance, print guidance, or the like.

The control panel 16 includes various kinds of control buttons arranged to be operated by the user, such as a "YES" button to be operated to decide an item selected from various items displayed on the image-taking/checking monitor 15, a "NO" button to be operated to cancel a decided item, and a "+" button and a "−" button to be operated to move a cursor or the like displayed on the image-taking/checking monitor 15.

The illumination devices 17A and 17B have a light-emitting member (flash) therein. When an image-taking operation is started and an image taken by the camera 48 in the image-taking section 21 is stored (captured) as a still image, the light-emitting member emits light at an appropriate timing, thereby irradiating a subject (user) with the light.

A pressure sensor 19 is provided at a predetermined position in the stool 18 at which the user sits so as to detect that the user is seated. Instead of providing the pressure sensor 19 in the stool 18, for example, a temperature sensor (not shown) may be placed below the image-taking/checking monitor 15 so that it can detect the entry of the user in the photography booth 1 based on a change in temperature.

The user sits on the stool 18 so as to face the front of the image-taking/checking monitor 15, and inserts coins corresponding to a predetermined charge into the coin slot 12, thereby causing the image-taking section 21 to start an image-taking operation. Alternatively, when the pressure sensor 19 provided at a predetermined position in the stool 18 detects the user (when the user sits), the result of detection is output to the image-taking section 21. In response thereto, the image-taking section 21 starts an operation of taking an image of the user.

Provided at the back of a wall in the housing 11 on which the image-taking/checking monitor 15 and the like are mounted are a coin box 20 in which coins inserted from the coin slot 12 are stored, the image-taking section 21 including a camera 48, a mirror 52 (FIG. 2), and the like, an image storage section 22 for storing reference image data, a digital printer 23 for printing a taken image (picture) of the user, a print outlet 24 for ejecting a print made by the digital printer 23, and the like.

Figure 2:
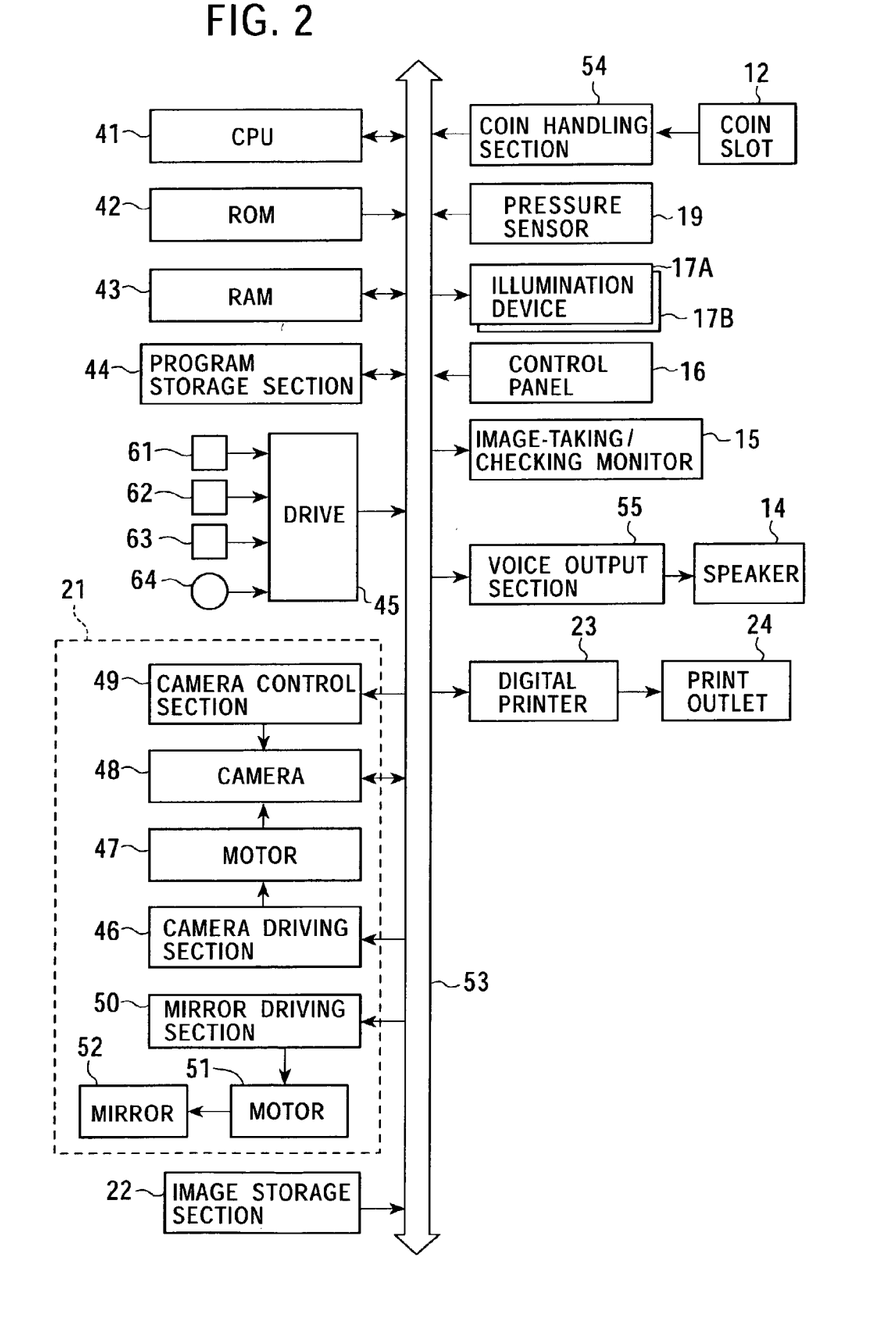
FIG. 2 is an explanatory view showing the inner configuration of the photography booth shown in FIG. 1.

FIG. 2 shows an example of an inner configuration of the photography booth 1 shown in FIG. 1. Descriptions of the components which have been described with reference to FIG. 1 are appropriately omitted.

A CPU (Central Processing Unit) 41 controls the overall operation of the photography booth 1 through a bus 53 according to a program loaded from a program storage section 44 into a RAM (Random Access Memory) 43. The RAM 43 appropriately stores data necessary for the CPU 41 to carry out various processes (including data on a taken image). A ROM (Read Only Memory) 42 stores information about a background image specified for an identification photograph.

The program storage section 44 includes a hard disk and a drive therefor, and stores various programs to be executed by the CPU 41. A driver 45 reads out data or programs recorded in a recording medium, such as a magnetic disk 61, an optical disk 62, a magnetooptical disk 63, or a semiconductor memory 64, to be loaded as necessary, and supplies the data or the programs to the CPU 41, the RAM 43, or the image storage section 22 through the bus 53. The driver 45 records data or programs on a loaded recording medium such as the magnetooptical disk 61, the optical disk 62, the magnetooptical disk 63, or the semiconductor memory 64.

In addition to the camera 48, such as a CCD (Charge Coupled Device), and the mirror 52, a camera driving section 46, a motor 47, a camera control section 49, a mirror driving section 50, and a motor 51 are placed inside the image-taking section 21. The camera driving section 46 drives the motor 47 under the control of the CPU 41 so as to move the camera 48 to a predetermined position. The camera control section 49 controls the zoom of the camera 48 under the control of the CPU 41. The mirror driving section 50 drives the motor 51 under the control of the CPU 41 so as to place the mirror 52 in a predetermined position or at a predetermined angle.

The image storage section 22 stores reference image data for each type of identification photograph to be compared with data on a taken image. The reference image data includes the coordinate position of a reference head top at which the head top of a subject image should be placed, and a reference image size of the subject (for example, a reference width of the face).

A coin handling section 54 counts coins inserted from the coin slot 12. When the coin handling section 54 determines that coins corresponding to a preset charge for an identification photograph are inserted, it notifies the CPU 41 of the insertion.

The digital printer 23 stores a plurality of printing sheets, and prints a taken image under the control of the CPU 41. An identification photograph (print) printed by the digital printer 23 is ejected to the print outlet 24, and is delivered to the user.

A voice output section 55 outputs voice guidance and effect sound, such as shutter sound, under the control of the CPU 41.

Figure 3:
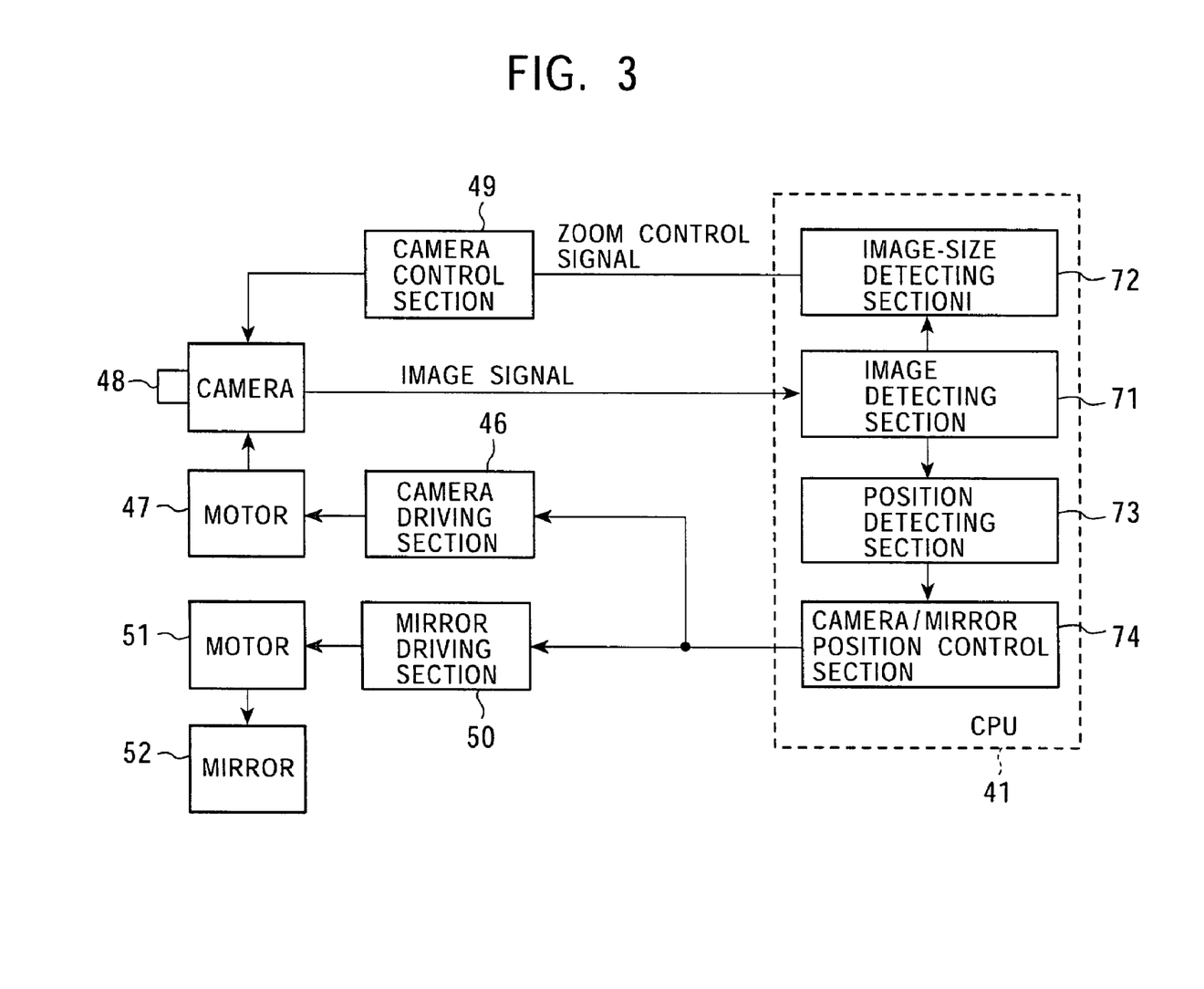
FIG. 3 is a block diagram showing the function of a CPU shown in FIG. 2.

FIG. 3 is a block diagram showing the function of the CPU 41.

An image detecting section 71 detects image signals captured by the camera 48, converts the image signals into digital data, and supplies the detection result (image data) to a position detecting sensor 73 which will be described later. When adjustment is made by the position detecting section 73 so that the head top of the subject is placed in a predetermined position, the image detecting section 71 supplies the detection result to an image-size detecting section 72 which will be described later. When adjustment is made by the image-size detecting section 72 so that the face of the subject is placed within a predetermined area, the image detecting section 72 supplies the detection result to the position detecting section 73 again.

The image-size detecting section 72 determines, on the basis of the detection result (concerning the face) supplied from the image detecting section 71, whether the size of the face of the subject coincides with the size specified for an identification photograph (reference image size included in the reference image data), and supplies a zoom control signal for controlling the zoom of the camera 48 to the camera control section 49 so that the size of the face of the subject coincides with the reference image size.

The position detecting section 73 determines, on the basis of the detection result supplied from the image detecting section 71, whether or not the head top of the subject image coincides with the a reference point specified for the identification photograph (coordinate position of a reference head top included in the reference image data), and supplies an adjustment signal for adjusting the positions of the camera 48 and the mirror 52 to a camera/mirror position control section 74 so that the head top coincides with the reference point.

The camera/mirror position control section 74 controls at least one of the camera driving section 46 and the mirror driving section 50 according to the adjustment signal supplied from the position detecting section 73.

Figure 4:
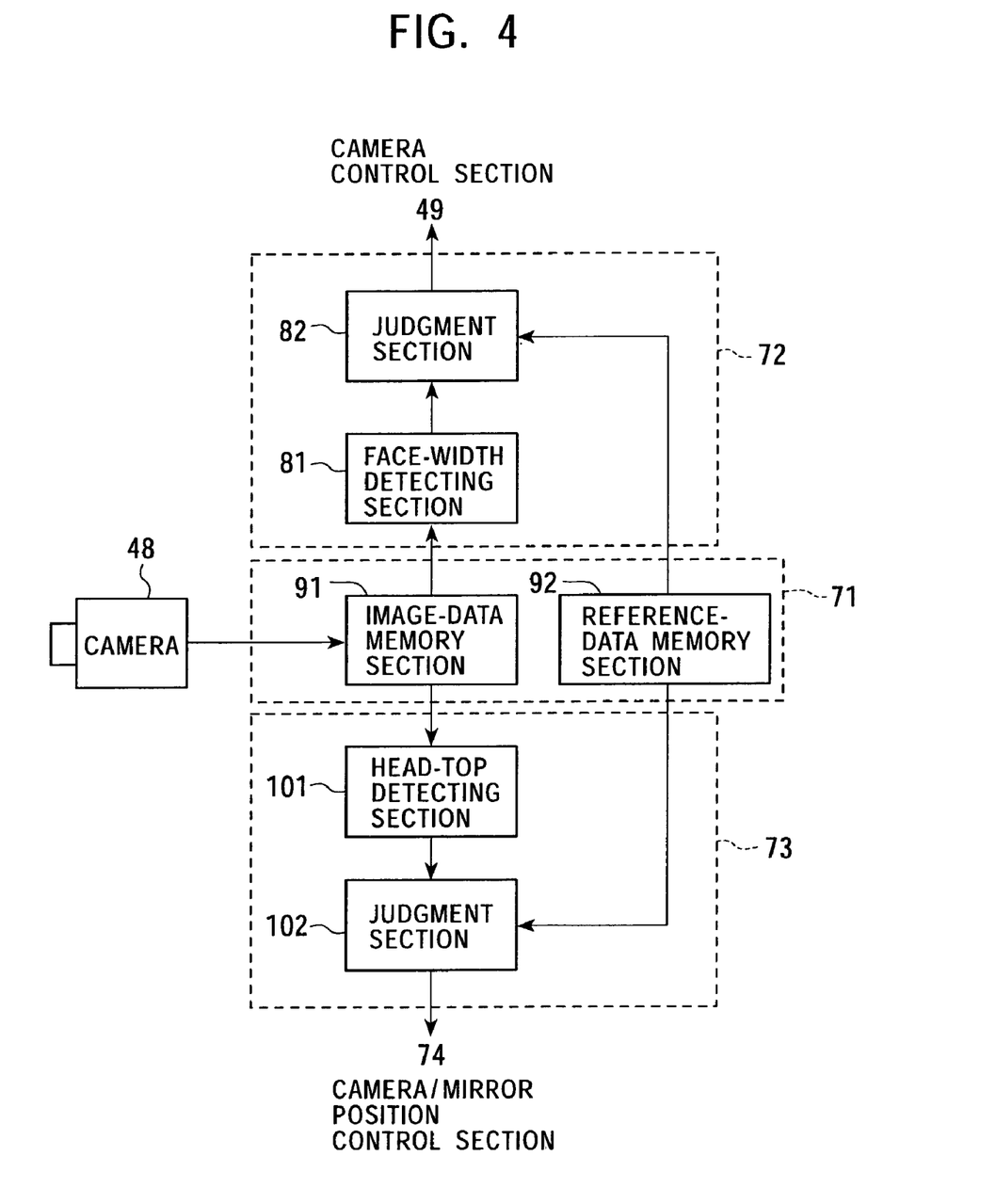
FIG. 4 is a block diagram showing detailed configurations of an image detecting section, an image-size detecting section, and position detecting section shown in FIG. 3.

FIG. 4 is a block diagram showing detailed configurations of the image detecting section 71, the image-size detecting section 72, and the position detecting section 73.

An image-data memory section 91 in the image detecting section 71 temporarily stores image data captured by the camera 48. A reference-data storage section 92 stores reference image data for each type of identification photograph, including the coordinate position of a reference head top and a reference image size.

A face-width detecting section 81 in the image-size detecting section 72 reads out the image data temporarily stored in the image-data memory section 91, detects the coordinates of the rightmost and leftmost portions of the face of the subject, and supplies a difference between the detected coordinates to a judgment section 82.

The judgment section 82 compares the detection result supplied from the face-width detecting section 81 (the width of the face of the subject) and the reference image size recorded in the reference image data read out from the reference-data memory section 71 (a reference width of the face of the subject image specified for the identification photograph), and determines whether or not both the sizes coincide with each other. When the judgment section 82 determines that the sizes do not coincide with each other, it supplies a zoom control signal for adjusting the zoom of the camera 48 to the camera control section 49.

A head-top detecting section 101 in the position detecting section 73 reads out the image data temporarily stored in the image-data memory section 91, detects the coordinates of the head top of the subject, and supplies the detection result to a judgment section 102.

The judgment section 102 compares the detection result supplied from the head-top detecting section 101 (the coordinates of the head top of the subject) and a reference head top recorded in the reference image data read out from the reference-data memory section 71 (coordinate position specified for the identification photograph at which the head top of the subject image should be placed), and determines whether or not both the coordinates coincide with each other. When the judgment section 102 determines that the coordinates do not coincide with each other, it supplies an adjustment signal for adjusting the position or angle of the camera 48 and/or the mirror 52 to the camera/mirror position control section 74.

FIGS. 5A to 5D illustrate methods for adjusting the positions or angle of the camera 48 or the mirror 52.

Figure 5A:
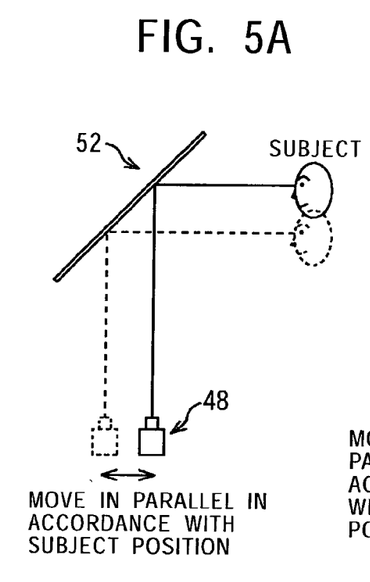
FIGS. 5A to 5D are explanatory view showing methods for adjusting the positions and angles of a camera and a mirror.

FIG. 5A shows a method for adjusting the position of the camera 48 when the mirror 52 is fixed. The camera driving section 46 drives the motor 47 under the control of the camera/mirror position control section 74 so as to move the camera 48 in parallel to the rightward/leftward direction in the figure in accordance with the position of the subject.

Figure 5B:
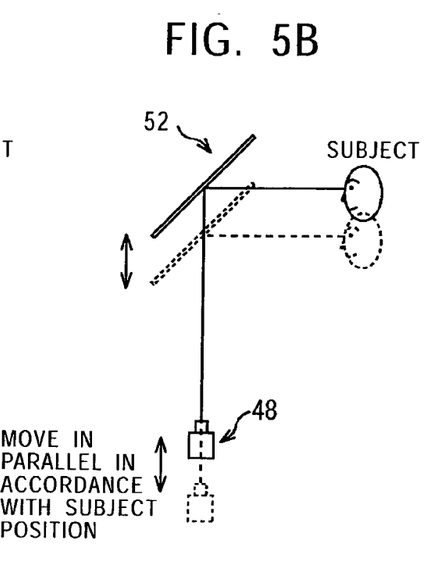

FIG. 5B shows a method for adjusting the positions of the camera 48 and the mirror 52 when the camera 48 and the mirror 52 are combined. The camera driving section 46 and the mirror driving section 50 drive the motors 47 and 51, respectively, under the control of the camera/mirror position control section 74 so as to move the camera 48 and the mirror 52 in parallel in the upward/downward direction in the figure in accordance with the position of the subject.

Figure 5C:
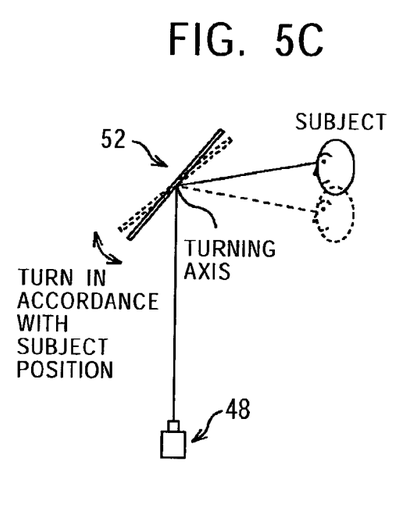

FIG. 5C shows a method for adjusting the angle of the mirror 52 when the camera 48 is fixed. The mirror driving section 50 drives the motor 51 under the control of the camera/mirror position control section 74 so as to turn the mirror 52 on its turning axis by a predetermined angle in accordance with the position of the subject.

Figure 5D:
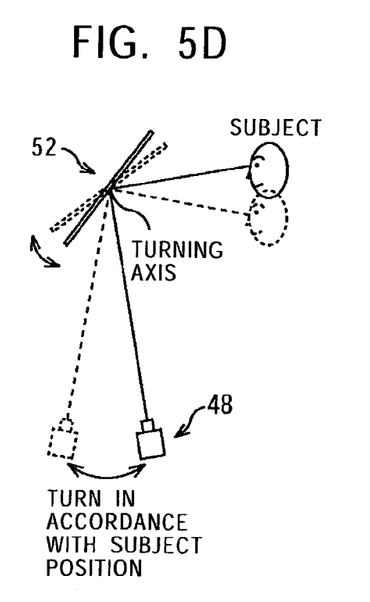

FIG. 5D shows a method for adjusting the angles of the camera 48 and the mirror 52 when the camera 48 and the mirror 52 are combined. The camera driving section 46 and the mirror driving section 50 drive the motors 47 and 51, respectively, under the control of the camera/mirror position control section 74 so as to turn the camera 48 and the mirror 52 on their turning axes by a predetermined angle in accordance with the position of the subject.

By any of the above adjustment methods, the image-taking position is adjusted so that the face of the subject is placed in the reference area. Some of the adjustment methods may be combined. For example, the camera 48 may be moved in parallel in the rightward/leftward direction and the mirror 52 may be turned by a predetermined angle by combining the adjustment methods shown in FIGS. 5A and 5C. Alternatively, the camera 48 and the mirror 52 may be moved in parallel in the upward/downward direction and may be turned by a predetermined angle by combining the adjustment methods shown in FIGS. 5B and 5D.

An identification-photograph taking operation to be performed by the photography booth 1 will now be described with reference to a flowchart shown in FIG. 6.

In Step S1 the pressure sensor 19 determines whether or not the user is detected, and repeats the determination until the user is detected. When the pressure sensor 19 determines that the user is detected, it supplies the detection result to the CPU 41.

Figure 6:
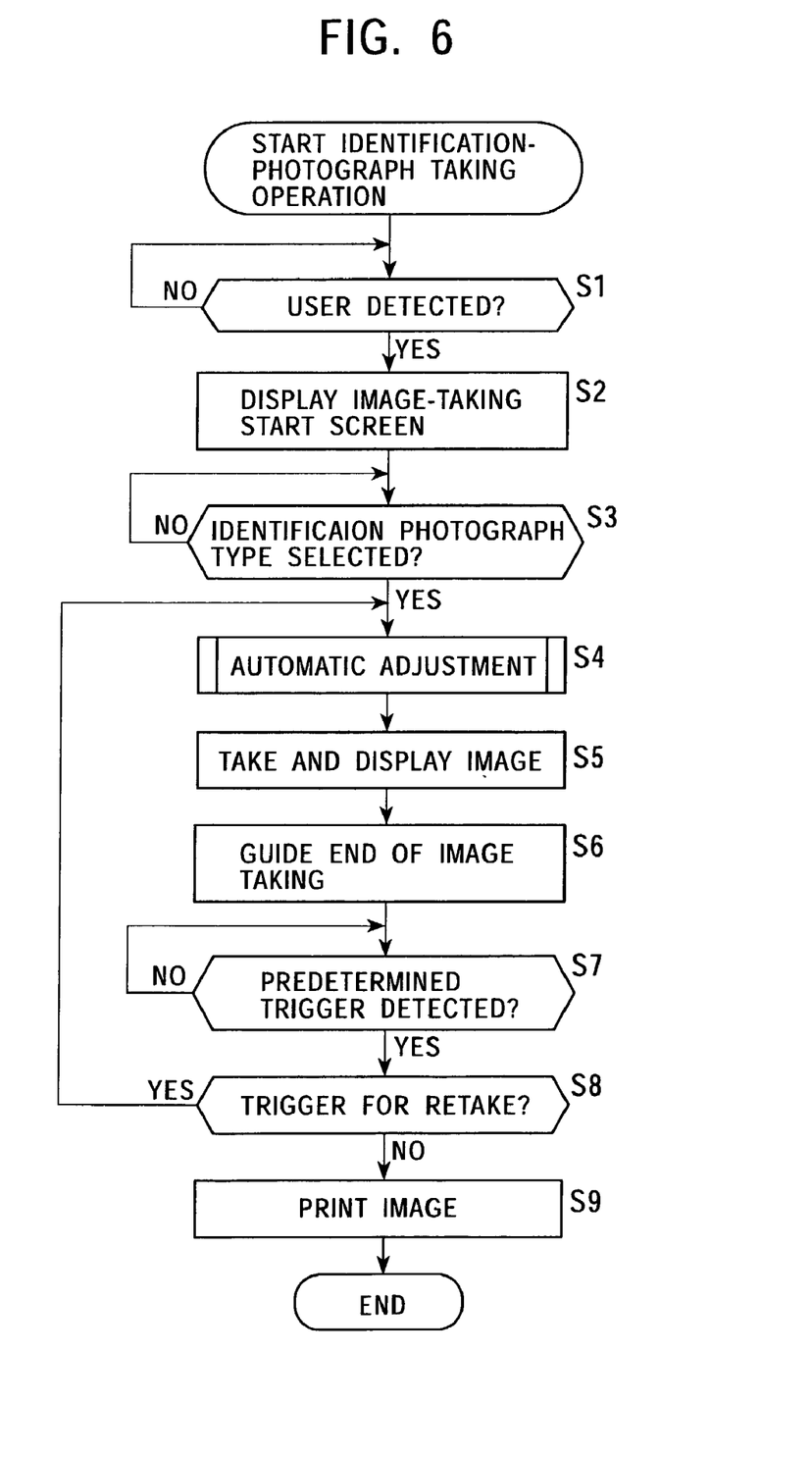
FIG. 6 is a flowchart of an identification-photograph taking operation.
Figure 7:
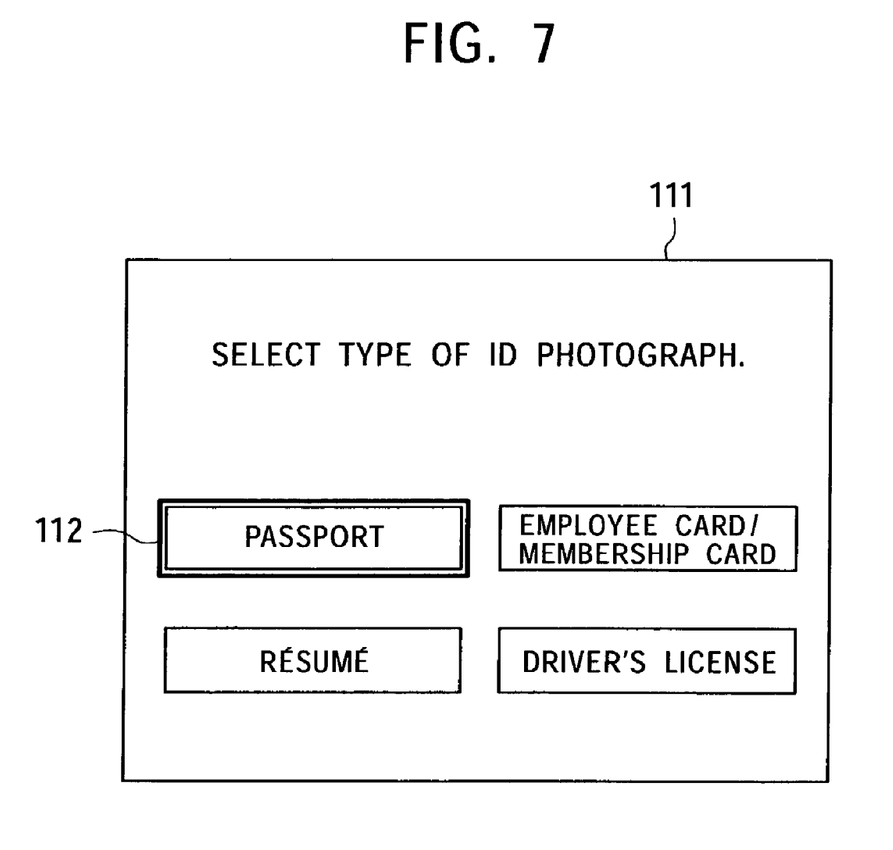
FIG. 7 is an explanatory view showing an example of an image-taking start screen.

In Step S2, the CPU 41 causes the image-taking/checking monitor 15 to display, for example, an image-taking start screen 111 shown in FIG. 7.

The image-taking start screen 111 shown in FIG. 7 displays, for example, a message "SELECT TYPE OF ID PHOTOGRAPH". The user moves a cursor 112 by operating the "+" button or "−" button on the control panel 16 in order to select one of the types of identification photographs used for "PASSPORT", "EMPLOYEE CARD/MEMBERSHIP CARD", "RÉSUMÉE", AND "DRIVER'S LICENSE". The user can decide the selection by pressing the "YES" button.

Referring again to FIG. 6, in Step S3, the CPU 41 determines whether or not the type of an identification photograph is selected by the operation of the control panel 16 by the user, and repeats the determination until the selection is decided. That is, the CPU 41 waits until the type of the identification photograph is selected, while displaying the image-taking start screen 111 in FIG. 7 on the image-taking/checking monitor 15.

When it is determined in Step S3 that the type of the identification photograph is selected, the CPU 41 makes an automatic adjustment to the camera 48 and the mirror 52 in Step S4. The automatic adjustment will now be described with reference to a flowchart shown in FIG. 8.

Figure 8:
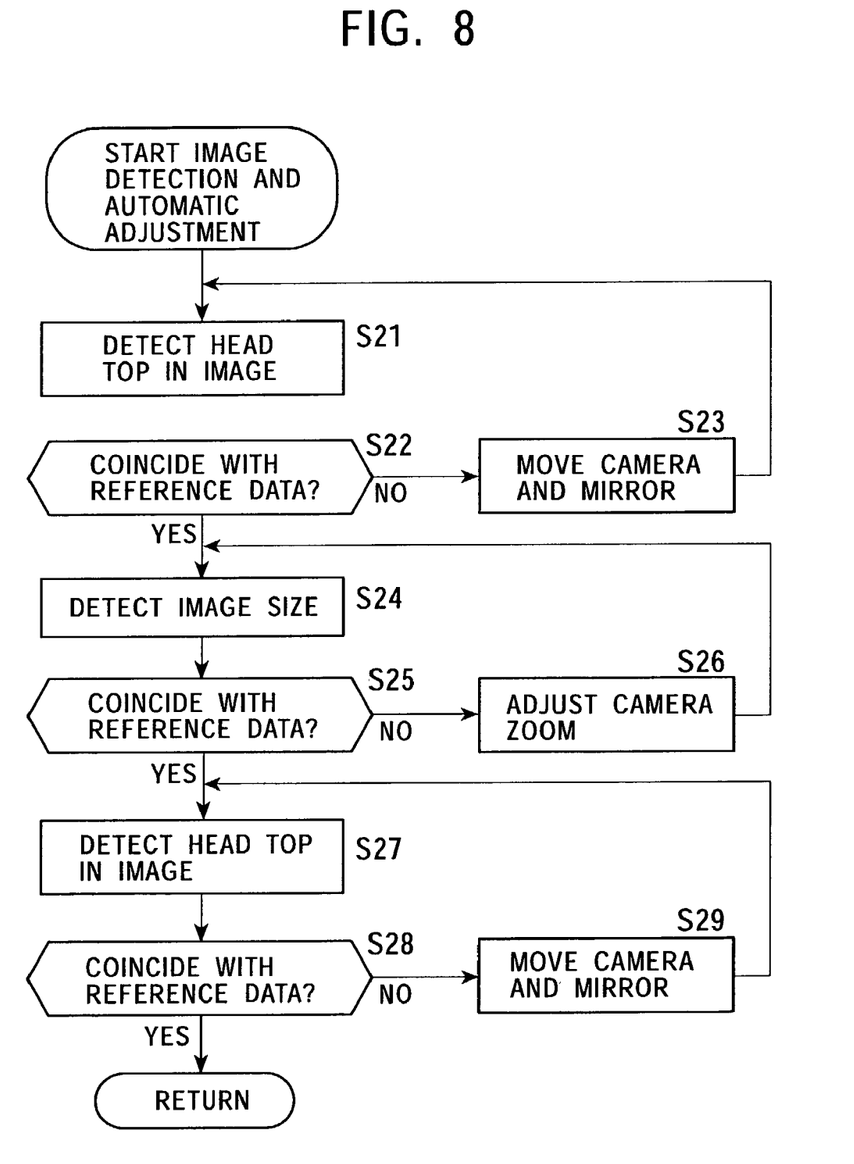
FIG. 8 is a flowchart further explaining automatic adjustment in Step S4 of FIG. 6.

In Step S21, the image detecting section 71 detects image signals of the subject captured by the camera 48, converts the image signals into digital data, and temporarily stores the data in the image memory section 91. The image data stored in the image memory section 91 and reference image data, stored in the reference-data memory section 92, on the identification photograph type selected by the user (for example, an identification photograph for a passport) are read out by the position detecting section 73.

The head-top detecting section 101 in the position detecting section 73 scans the image data read from the image-data memory section 91 of the image detecting section 71.

Figure 9A:
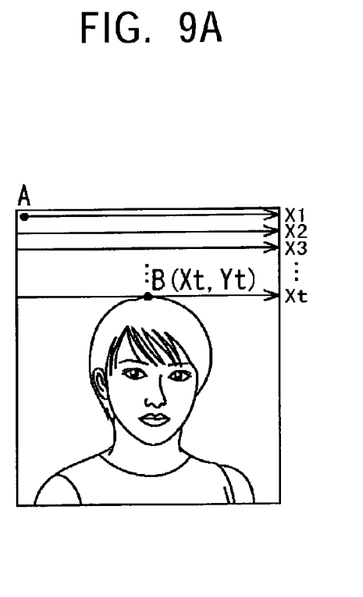
FIGS. 9A to 9C are explanatory views showing an operation of detecting the head top and the image size.

More specifically, as shown in FIG. 9A, x-direction (horizontal) scanning from a point A at the upper left end is repeated in the y-direction (vertical direction) along lines x1, x2, x3, . . . , xt. The head-top detecting section 101 compares the preset color (for example, blue) of the background image and colors of pixels to be scanned sequentially, and detects a point (pixel), at which a different color is first detected, as the head top of the subject. That is, in the example in FIG. 9A, the coordinates (Xt, Yt) of a point B in a line xt is detected as the head top.

Figure 9B:
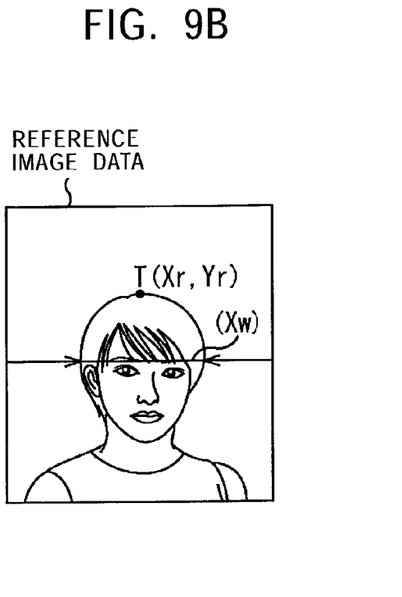

In Step S22, the judgment section 102 compares the head top (the point B in FIG. 9A) of the subject image detected by the head-top detecting section 101 in Step S21 and the coordinates of a reference head top (coordinates (Xr, Yr) of a point T in FIG. 9B) recorded in the reference image data read from the reference-data memory section 92, and determines whether or not both the coordinates coincide with each other. When the judgment section 102 determines that the coordinates of the head top of the subject and the coordinates of the reference head top do not coincide with each other, it supplies an adjustment signal for adjusting the position or angle of the camera 48 and/or the mirror 52 to the camera/mirror position control section 74.

According to the adjustment signal, in Step S23, the camera/mirror position control section 74 controls at least one of the camera driving section 46 and the mirror driving section 50.

For example, in a case in which the mirror 52 is fixed, as shown in FIG. 5A, the camera 48 is moved in parallel in the rightward/leftward direction in accordance with the position of the subject. In a case in which the camera 48 and the mirror 52 are combined, as shown in FIGS. 5B and 5D, the camera 48 and the mirror 52 are moved in parallel in the upward/downward direction or are turned on their turning axes by a predetermined angle in accordance with the position of the subject. In a case in which the camera 48 is fixed, as shown in FIG. 5C, the mirror 52 is turned on its turning axis by a predetermined angle in accordance with the position of the subject.

After at least one of the camera 48 and the mirror 52 is moved for adjustment in accordance with the subject in Step S23, the above-described operation in Step S21 is repeated.

When it is determined in Step S22 that the coordinates of the head top of the subject and the coordinates of the reference head top coincide with each other, in Step S24, the image detecting section 71 detects image signals of the subject further captured by the camera 48, converts the image signals into digital data, and temporarily stores the data in the image memory section 91. Then, the image-size detecting section 72 reads out the image data stored in the image memory section 91 and reference image data, stored in the reference-data memory section 92, on the identification photograph type (for example, a photograph for a passport) selected by the user.

The face-width detecting section 81 in the image-size detecting section 72 scans the image data read from the image-data memory section 91 in the image detecting section 71.

Figure 9C:
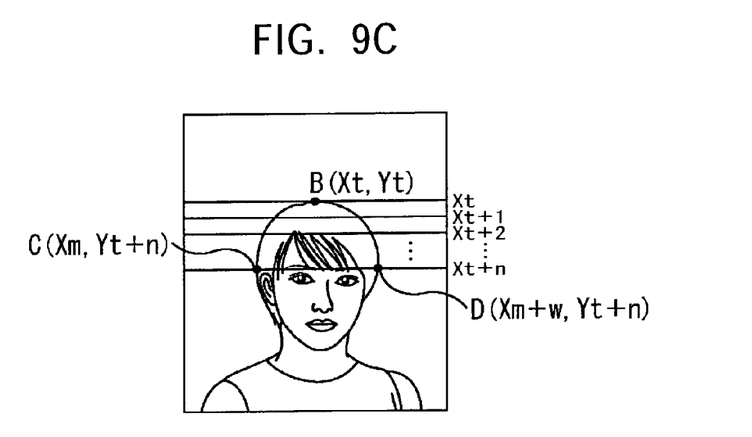

More specifically, as shown in FIG. 9C, x-direction scanning is repeated in the y-direction from the scanning line xt at the head top of the subject detected by the head-top detecting section 101 in the position detecting section 73 to xt+1, xt+2, xt+3, . . . , xt+n. The face-width detecting section 81 compares the preset color (for example, blue) of the background image and the colors of pixels scanned sequentially, detects a point (pixel) at which a different color is detected and a point at which the color of the background image is detected again, and detects the first x-direction scanning line xt+n in which the difference between the x-direction coordinates of the points is largest. That is, in the example in FIG. 9C, the coordinates of a point C in the line xt+2 (Xm, Yt+n) and the coordinates of a point D (Xm+w, Yt+n) are detected, and a difference Δx therebetween is calculated (Δx=(Xm−Xm+w)).

In Step S25, the judgment section 82 compares the image size of the face of the subject (the difference Δx between the coordinates of the points D and C in FIG. 9) detected (calculated) by the face-width detecting section 81 in Step S24, and a reference image size Xw (FIG. 9B) recorded in the reference image data read from the reference-data memory section 71, and determines whether or not the sizes coincide with each other. When the judgment section 82 determines that the image size Δx of the subject and the reference image size Xw do not coincide with each other, it supplies a zoom control signal for adjusting the zoom of the camera 48 to the camera control section 49.

According to the zoom control signal, in Step S26, the camera control section 49 adjusts the zoom of the camera 48 so that the image size of the face of the subject coincides with the reference image size. Subsequently, the above-described operation in Step S24 is repeated.

In Step S25, when it is determined that the image size Δx of the face of the subject and the reference image size Xw coincide with each other, Step S27 is performed.

Since operations in Steps S27 to S29 are similar to those in the above Steps S21 to 23, descriptions thereof are simplified.

That is, in Step S27, the image detecting section 71 temporarily stores image data on the subject further captured by the camera 48 in the image-data memory section 91. The head-top detecting section 101 in the position detecting section 73 reads out the image data temporarily stored in the image-data memory section 91, and detects the head top of the subject again, as described with reference to FIG. 9A. In Step S28, the judgment section 102 determines whether or not the coordinates of the head top of the image of the subject detected in Step S27 and the coordinates of the reference head top recorded in the reference image data read from the reference-data memory section 92. When the judgment section 102 determines that the coordinates do not coincide with each other, it supplies an adjustment signal for adjusting the position or angle of the camera 48 and/or the mirror 52 to the camera/mirror position control section 74.

According to the adjustment signal, in Step S29, the camera/mirror position control section 74 moves at least one of the camera 48 and the mirror 52 for adjustment, as described with reference to FIGS. 5A to 5D. Subsequently, the above operation in Step S27 is repeated.

In Step S28, when it is determined that the coordinates of the head top of the subject and the coordinates of the reference head top coincide with each other, Step S5 shown in FIG. 6 is repeated.

In this way, in the automatic adjustment of the camera 48 and the mirror 52, first, the camera 48 and the mirror 52 are moved so that the coordinates of the head top of the image of the subject coincide with the coordinates of the reference head top. Secondly, the zoom of the camera 48 is adjusted so that the image size of the face of the subject whose head top is adjusted coincides with the reference image size. Thirdly, the camera 48 and the mirror 52 are moved again so that the coordinates of the head top of the image of the subject coincide with the coordinates of the reference head top. Therefore, it is possible to precisely and automatically adjust the image-taking position of the subject.

After the image-taking position of the subject is adjusted in Step S5 in FIG. 6, the camera 48 captures an image of the subject as a still image. The CPU 41 causes the speaker 14 through the voice output section 55 to output a voice message, for example, "Here we go.", simultaneously with the image capturing.

Figure 10:
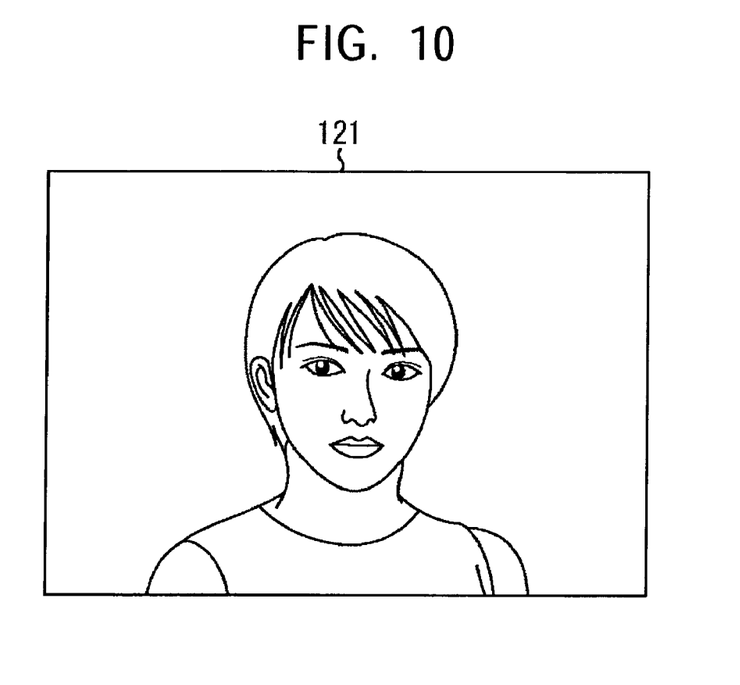
FIG. 10 is an explanatory view showing an example of a check screen displayed on an image-taking/checking monitor.

At the image-capturing timing, the CPU 41 controls the illumination devices 17A and 17B to irradiate the subject with light from the light emitting members, and at that instant, causes the image-taking/checking operation 15 to display the static image captured by the camera 48. Consequently, for example, a check screen 121 shown in FIG. 10 is displayed.

In Step S6, simultaneously with displaying the check screen 121, the CPU 41 causes the speaker 14 through the voice input section 55 to output, by voice, a message "Please press the YES button if this image to be printed, or press the NO button to cancel the image. If no operation is performed, this image will be printed out.", or causes the check screen 121 to display the message, thereby notifying the user of the completion of the image-taking operation.

Since the image-taking operation is started when the photosensor 19 detects the user in Step S1 (since the charge for a photograph has not been paid in this case), in addition to the above message, for example, a message "Please insert coins for necessary photographs." may be output by voice or may be displayed so that the user can pay the charge when the completion of the image-taking operation is guided.

In Step S7, the CPU 41 determines whether a predetermined trigger is detected, that is, whether the "YES" button or the "NO" button on the control panel 16 is selected by the user, whether the timeout is detected without any operation of the button, whether the pressure sensor 19 does not detect the user (the user separates from the stool 18), or whether the insertion of a predetermined number of coins in the coin slot 12 is notified by the coin handling section 54. The CPU 41 repeats the determination until it detects the predetermined trigger.

When it is determined that the predetermined trigger is detected in Step S7, the CPU 41 determines in Step S8 whether or not the trigger is made for retaking, that is, whether or not the trigger is an input signal produced by selecting the "NO" button on the control panel 16. When the CPU 41 determines that the trigger is for retaking, it repeats the above operation in Step S4.

In this case, the CPU 41 may cause the speaker 14 through the voice output section 55 to output a voice message "Retaking is to be performed, so please be seated in a right position".

Figure 11:
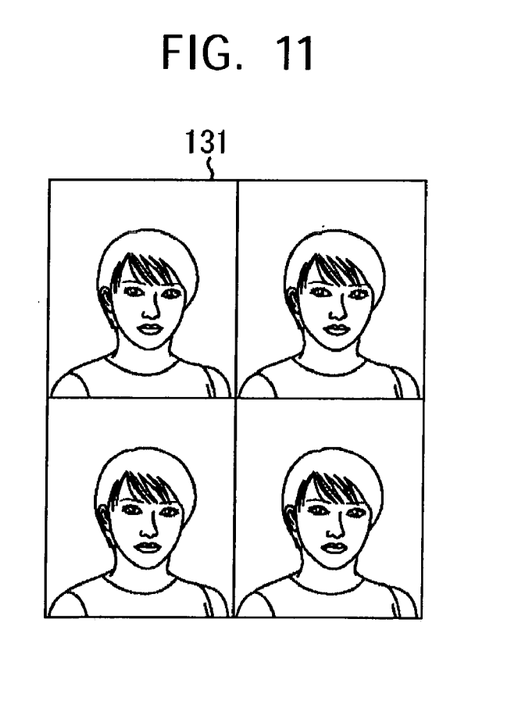
FIG. 11 is an explanatory view showing an example of an image print.

When it is determined in Step S8 that the trigger is not for retaking, that is, when the "YES" button is pressed, when the timeout is detected, or when a predetermined number of coins are inserted, in Step S9, the digital printer 23 prints the image captured by the camera 48 into, for example, a print 131 shown in FIG. 11. The print 131 having the image is ejected to the print outlet 24 to be delivered to the user.

In this case, the image may be printed in the following methods, instead of being printed with the digital printer 23.

For example, the image data is recorded in a recording medium, such as a memory card, the recording medium is loaded in a drive of a printing device (not shown) provided separately from the photography booth 1, and the printing device reads out the image data from the loaded recording medium and prints the image.

For example, the photography booth 1 transfers image data to a printing device through a communicating section (not shown), and the printing device receives the image data transferred from the photography booth 1, and prints the image.

In this case, the next user does not need to wait until printing of an image of the preceding user is completed, and can use the photography booth 1 simultaneously with the completion of the capturing of the image of the preceding user. That is, the above methods are suited to create many employee ID cards in a company having many employees.

In general, the number of identification photographs which the photography booth 1 can deliver to the user in one image-taking operation is specified beforehand (for example, a four-frame type or a six-frame type). Therefore, it is troublesome for the user to repeat the image-taking operation many times in order to obtain a larger number of identification photographs than the specified number.

Accordingly, for example, the user inserts more charge than usual before starting an image-taking operation, and inputs the number of necessary identification photographs through the control panel 16 at the completion of the image-taking operation. Consequently, the photography booth 1 delivers the required number of identification photographs (prints 131) to the user. When the paid charge is more than required, the difference is returned to the coin return 13.

Alternatively, for example, in a case in which the photography booth 1 starts an image-taking operation in response to the detection of the user by the pressure sensor 19, a message "Please input the number of necessary photographs." may be output from the speaker 14. After the user inputs the number of necessary photographs, the photography booth 1 may demand payment for the input number of photographs.

The above-described operations may be performed by software. A program that forms software is installed from a recording medium into a computer incorporated in special hardware, or into, for example, a general-purpose personal computer that can execute various functions according to various installed programs.

The recording medium stores a program and is distributed to users to provide the program, separately from the computer. The recording medium is a package medium or the like, for example, a magnetic disk 61 (including a flexible disk), an optical disk 62 (including a CD-ROM (Compact Disk-Read Only Memory) and a DVD (Digital Versatile Disk)), a magnetooptical disk 63 (including an MD (Mini-Disk)), or a semiconductor memory 64.

In this specification, the steps of the program recorded in the recording medium include not only steps to be performed in time sequence in the described order, but also steps to be performed in parallel or separately without being performed in time sequence.

While the present invention has been described with reference to what is presently considered to be the preferred embodiment, it is to be understood that the invention is not limited to the disclosed embodiment. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image processing apparatus comprising:
   an image-taking unit for taking an image of a subject;
   a first detecting unit for detecting the head top of the image of the subject taken by said image-taking unit;
   a first judgment unit for comparing the head top detected by said first detecting unit and first reference data to determine whether the detected head top coincides with the first reference data;
   a second detecting unit for detecting the image size of a predetermined portion of the image of the subject;
   a second judgment unit for comparing the image size detected by said second detecting unit with second reference data to determine whether the detected image size coincides with the second reference data; and
   a control unit for controlling an image-taking position of said image-taking unit on the basis of results of the determinations by said first and second judgment units.

2. An image processing apparatus as in claim 1 further comprising:
   a sensing unit for sensing the subject,
   wherein said image-taking unit takes the image of the subject when the subject is sensed by said sensing unit.

3. An image processing apparatus according to claim 1, further comprising:
   a storage unit for storing the first and second reference data.

4. An image processing apparatus according to claim 1, further comprising:
   a display control unit for controlling the display of the image of the subject taken by said image-taking unit.

5. An image processing apparatus according to claim 1, further comprising:
   a printing unit for printing the image of the subject taken by said image-taking unit when said first and second judgement units determine that the detected head top and the first reference data coincide with each other, and that the detected image size and the second reference data coincide with each other.

6. An image processing apparatus according to claim 1, wherein said second detecting unit detects the lateral size of a face of the subject.

7. An image processing apparatus according to claim 1, wherein said control unit adjusts the position of at least one of a camera and a mirror.

8. An image processing method comprising:
   an image-taking step of taking an image of a subject with an image-taking unit;
   a first detecting step of detecting the head top of the image of the subject taken in said image-taking step;
   a first judgment step of comparing the head top detected in said first detecting step and first reference data to determine whether the detected head top coincides with the first reference data;
   a second detecting step of detecting the image size of a predetermined portion of the image of the subject;
   a second judgment step of comparing the image size detected in said second detecting step with second reference data to determine whether the detected image size coincides with the second reference data; and
   a control step of controlling an image-taking position of said image-taking unit on the basis of results of the determinations in said first and second judgment steps.

9. A recording medium having a computer-readable program recorded therein, wherein said program comprises:
   an image-taking step of taking an image of a subject with an image-taking unit;
   a first detecting step of detecting the head top of the image of the subject taken in said image-taking step;

a first judgment step of comparing the head top detected in said first detecting step and first reference data to determine whether the detected head top coincides with the first reference data;

a second detecting step of detecting the image size of a predetermined portion of the image of the subject;

a second judgment step of comparing the image size detected in said second detecting step with second reference data to determine whether the detected image size coincides with the second reference data; and a control step of controlling an image-taking position of said image-taking unit on the basis of results of the determinations in said first and second judgment steps.

10. A computer readable medium encoded with a computer program that executes steps, wherein said steps comprises:

an image-taking step of taking an image of a subject with an image-taking unit;

a first detecting step of detecting the head top of the image of the subject taken in said image-taking step;

a first judgment step of comparing the head top detected in said first detecting step and first reference data to determine whether the detected head top coincides with the first reference data;

a second detecting step of detecting the size of a predetermined portion of the image of the subject;

a second judgment step of comparing the image size detected in said second detecting step with second reference data to determine whether the detected image size coincides with the second reference data; and a control step of controlling an image-taking position of said image-taking unit on the basis of results of the determinations in said first and second judgment steps.

* * * * *